United States Patent
Qiu et al.

(10) Patent No.: US 8,546,011 B2
(45) Date of Patent: Oct. 1, 2013

(54) METHOD FOR PRODUCING ASSEMBLED BATTERY AND ASSEMBLED BATTERY

(75) Inventors: Xinping Qiu, Beijing (CN); Xi Zheng, Beijing (CN); Jie An, Beijing (CN); Wentao Zhu, Beijing (CN)

(73) Assignees: Tsinghua University, Beijing (CN); Beijing Hua Chuang Hong Li Energy Technologies Ltd., Beijing (CN)

( * ) Notice: Subject to any disclaimer, the term of this patent is extended or adjusted under 35 U.S.C. 154(b) by 238 days.

(21) Appl. No.: 13/057,653

(22) PCT Filed: Feb. 2, 2010

(86) PCT No.: PCT/CN2010/070469
§ 371 (c)(1),
(2), (4) Date: Feb. 4, 2011

(87) PCT Pub. No.: WO2011/035565
PCT Pub. Date: Mar. 31, 2011

(65) Prior Publication Data
US 2012/0114995 A1 May 10, 2012

(30) Foreign Application Priority Data
Sep. 28, 2009 (CN) .......................... 2009 1 0179113

(51) Int. Cl.
*H01M 10/50* (2006.01)
*H01M 2/00* (2006.01)
*H01M 2/08* (2006.01)

(52) U.S. Cl.
USPC ............ 429/120; 429/163; 429/164; 429/182

(58) Field of Classification Search
None
See application file for complete search history.

(56) References Cited

U.S. PATENT DOCUMENTS

| | | | |
|---|---|---|---|
| 1,402,956 A | 1/1922 | Politowski | |
| 1,436,616 A | 11/1922 | Walsh | |
| 2,487,831 A * | 11/1949 | Rupp | 429/94 |
| 3,635,766 A | 1/1972 | Quisling | |
| 4,262,064 A | 4/1981 | Nagle | |
| 5,492,779 A * | 2/1996 | Ronning | 429/120 |
| 5,501,916 A | 3/1996 | Teramoto et al. | |
| 7,264,902 B2 | 9/2007 | Horie et al. | |
| 2004/0142237 A1* | 7/2004 | Asano | 429/161 |
| 2005/0174092 A1 | 8/2005 | Dougherty et al. | |
| 2006/0035147 A1* | 2/2006 | Lam et al. | 429/218.1 |

FOREIGN PATENT DOCUMENTS

| | | |
|---|---|---|
| CN | 1753205 A | 3/2006 |
| CN | 101577344 A | 11/2009 |
| EP | 1705743 A1 | 9/2006 |
| JP | 61110972 A | 5/1986 |
| JP | 2003288863 A | 10/2003 |
| JP | 2007115437 A | 5/2007 |

\* cited by examiner

*Primary Examiner* — Cynthia K. Walls
(74) *Attorney, Agent, or Firm* — The Webb Law Firm

(57) ABSTRACT

A method for producing an assembled battery, comprising the following steps: (a) producing a plurality of unit cells; (b) arranging the plurality of unit cells in a nested manner such that one unit cell is disposed within another unit cell; and (c) electrically connecting the plurality of unit cells with one another in parallel or in series. The problem that toroidal batteries with high capacity, high power density and small thickness may have a large volume and low energy density is solved by connecting in parallel a plurality of unit cells nested within one another, and heat dissipation of the battery is also further improved. An assembled battery produced by the method is also provided.

21 Claims, 15 Drawing Sheets

METHOD FOR PRODUCING ASSEMBLED BATTERY AND ASSEMBLED BATTERY

FIELD OF THE INVENTION

The invention relates to a method for producing an assembled battery, and especially to a method for producing an assembled power battery with a high capacity and a high power which is applicable for electric vehicles, intelligent power network and the like. The invention also relates to an assembled battery produced by said method.

BACKGROUND OF THE INVENTION

Since the beginning of 1990s, appearance and gradual promotion of lithium-ion battery have brought about, to some extent, rapid development of portable devices. In the recent ten years, due to quick improvement in safety and rate performance, power battery can be applied to various fields, such as large electric tools, hybrid motor vehicles and electric motor vehicles, etc., to work with high output torque motor, at least partially taking the place of power system that is dependent completely on combustion engines, which triggers a new round of upsurge in green energy resource.

Currently, due to concern about poor heat dissipation within a high capacity solid power battery, lithium-ion power batteries that have been commercialized in small scale usually have a unit capacity of 8-100 Ah, among which, typical lithium-ion power batteries include: SPIM24300260 100 Ah rectangular lithium-ion power battery from Citic Guoan Mengguli New Energy Science & Technology Co., Ltd., and IMP20/66/148-08PS 8Ah high-power battery from Phylion Battery (Suzhou) Co., Ltd. Based on these battery cells, a person in the art may increase the voltage and capacity of a battery pack by connecting battery cells in series and in parallel to meet demands in different fields. For example, Beijing Zhongweixintong Science & Technology Co., Ltd. has developed a UPS sample product ZWDY-48/300 which uses a 48V-300 Ah battery pack for telecom field, with the battery pack consisting of power unit cells with a unit capacity of 10 Ah.

EP1705743A1 relates to a battery module having a plurality of unit cells. In the battery module, the unit cells are spaced apart from each other by a predetermined distance and are connected in series or in parallel.

US2005/0174092A1 relates to a battery system for use in a vehicle, which includes a plurality of electrically connected lithium batteries. According to one embodiment, the battery system comprises a module that includes a plurality of (e.g. ten) lithium batteries electrically connected in series. According to another embodiment, the module may be coupled to a wire or a cable via a connector so as to connect the module to another module or to a vehicle electrical system.

Nevertheless, the power output characteristic of the existing solid power battery still cannot fulfill the requirements in some high-level fields, such that engineers could only obtain the desired high power output characteristic by decreasing cell capacity, providing clearance and adopting forced ventilation. A typical example is the electric motor vehicle "Tesla Roadster" produced by the US Tesla Motors, which entered mass production in March, 2008. In order to realize acceleration from rest to a speed of 100 km/h within 4 s, its battery pack uses the currently most mature 18650-type lithium-ion battery cells, and as many as 6831 such 18650-type lithium-ion battery cells are used for each motor vehicle. Obviously, this greatly increases complexity of the power management system, complexity of assembly and maintenance of the battery pack as well as reliability of whole power system.

With further reduction in product cost of power battery products in future years, when the application of power battery products is extended to fields of energy storage and peak regulation in power stations, power network filtering, emergency power for electric locomotive and so on, it is almost impossible to image how to combine cells with a capacity less than 100 Ah together to meet power requirement up to MW level in these fields.

As an improvement, U.S. Pat. No. 5,501,916A discloses a battery cell, wherein a through-hole is provided in the battery core, and a lid forming the battery shell is closely attached, directly or via aluminum plate(s) that are thermally connected to the lid, to at least a part of sidewall of the through-hole in the battery core, thereby heat dissipation within the cell can be improved.

However, it should be noted that, provision of a through-hole as mentioned in the above patent is not the key point for solving the problem of heat dissipation. The key for solving the heat dissipation problem is to limit the maximum thickness of the battery core. Although the maximum thickness of the battery core may be reduced by providing a through-hole, for the cases where the capacity of a battery cell increases up to more than 300 Ah or the maximum thickness of a solid battery core is equal to or greater than 100 mm, due to limitation to the maximum thickness of the battery core imposed by safety and rate performance requirement, simply increasing the diameter or the number of through-holes may solve the problem of heat dissipation within the battery, nevertheless bring about other problems. For example, an increase of through-hole diameter will increase the void (ineffective) volume in the through-hole, resulting in a reduction of energy density and power density of the battery cell and consequently of the entire battery pack, while an increase in number of through-holes will apparently increase manufacture difficulty and cost.

SUMMARY OF THE INVENTION

The invention aims to provide a battery product which can not only solve the heat dissipation problem effectively but also has a high capacity, high safety, high energy density and high power density, and a method for producing the same, so as to overcome the disadvantages of power batteries in the prior art as set forth above.

Therefore, an aspect of the invention relates to a method for producing an assembled battery or battery pack easily and quickly with low costs. The method for producing an assembled battery according to the invention comprises the following steps: (a) producing a plurality of unit cells; (b) arranging the plurality of unit cells in a nested manner such that one unit cell is disposed within another unit cell; and (c) electrically connecting the plurality of unit cells with one another in parallel or in series. Thus, the battery product produced by the method according to the invention is an assembled battery or battery pack having a plurality of unit cells.

According to an advantageous configuration, the step (a) includes: producing a plurality of toroidal unit cells each having a through-hole, each toroidal unit cell comprising an inner side wall defining the through-hole of the toroidal unit cell, an outer side wall defining an outer circumference of the toroidal unit cell, and a core between the inner side wall and the outer side wall; the step (b) includes: arranging the plurality of toroidal unit cells in a nested manner such that one toroidal unit cell is disposed within the through-hole of another toroidal unit cell.

According to another advantageous configuration, the step (a) includes: producing a solid unit cell, and one or more toroidal unit cells each having a through-hole, the solid unit cell comprising a core and an outer side wall defining an outer circumference of the solid unit cell, and each toroidal unit cell comprising an inner side wall defining the through-hole of the toroidal unit cell, an outer side wall defining an outer circumference of the toroidal unit cell, and a core between the inner side wall and the outer side wall; the step (b) includes: arranging the solid unit cell and the one or more toroidal unit cells in a nested manner such that one unit cell is disposed within the through-hole of another unit cell.

According to the invention, the problem that toroidal batteries with high capacity, high power density and small thickness may have a large volume and low energy density is solved by producing a plurality of unit cells nested within one another and connected in parallel, and heat dissipation of the assembled battery or battery pack is also further improved. Specifically, a plurality of unit cells are produced to have different sizes, so that a unit cell with smaller cross-section can be disposed within the through-hole of a unit cell with larger cross-section, thereby all the unit cells are arranged in a nested manner. Thus, a battery product with a high capacity and good heat dissipation is obtained, while the void volume in the through-hole of the unit cell is utilized effectively, so that the energy density of the battery product is also increased.

Advantageously, regarding the toroidal unit cells in the assembled battery, the step (a) comprises the following steps for producing each toroidal unit cell: (a1) winding an positive electrode sheet coated with slurry, a separator, and a negative electrode sheet coated with slurry around a hollow cylindrical winding shaft to form the core of the toroidal unit cell, and forming the inner side wall of the toroidal unit cell by the hollow cylindrical winding shaft; (a2) placing the core with the inner side wall attached thereto into a shell, and forming the outer side wall of the toroidal unit cell by the shell; (a3) assembling a top cover plate, a bottom cover plate and the inner side wall, the outer side wall of the toroidal unit cell together in such a way as to enclose the core of the toroidal unit cell.

In a situation where the assembled battery includes a solid unit cell, the step (a) further comprises the following steps for producing the solid unit cell: (a1') forming the core of the solid unit cell; (a2') placing the core of the solid unit cell into a shell, and forming the outer side wall of the solid unit cell by the shell; (a3') assembling a top cover plate, a bottom cover plate and the outer side wall of the solid unit cell together in such a way as to enclose the core of the solid unit cell.

In the step (a3), the top cover plate, the bottom cover plate and the inner side wall, the outer side wall may be welded together, so as to ensure sealing and securing between respective cover plates and respective side walls, and to facilitate heat transfer between cover plates and side walls.

According to an advantageous configuration, an inner-end current collector portion that is not coated with slurry is reserved at the innermost end of the positive electrode sheet or the negative electrode sheet which is to contact directly with a surface of the hollow cylindrical winding shaft, and at least a part of the inner-end current collector portion is welded to the surface of the hollow cylindrical winding shaft. In addition, the reserved inner-end current collector portion may be wound around the surface of the hollow cylindrical winding shaft by more than one turn. The above measures may facilitate heat dissipation from inside of the battery core to the outside via the hollow cylindrical winding shaft.

Similarly, in order to facilitate heat dissipation from inside of the battery core to the outside via the cell shell, an outer-end current collector portion that is not coated with slurry may also be reserved at the outermost end of the positive electrode sheet or the negative electrode sheet which is to be wound at the outermost side around the hollow cylindrical winding shaft, and the outer-end current collector portion contacts directly with the shell.

According to a specific configuration, when producing respective unit cells, the inner side wall of the outer unit cell of two adjacent nested unit cells serves as the outer side wall of the inner unit cell of the two adjacent nested unit cells, so that the two adjacent nested unit cells share a common side wall. In this way, nesting of two adjacent unit cells can be accomplished accordingly during the process of producing the inner unit cell nested inside, which may result in a simplification of the production process and consequently an increase of productivity, and may also improve the heat dissipating performance and energy density of the battery. Furthermore, the mechanical structure of the assembled battery may be more compact and stable since the two adjacent unit cells share a common side wall.

In a variation of the above specific configuration, the step (a) and the step (b) are carried out together, wherein the plurality of unit cells are produced and nested successively from inside to outside according to nesting positional relationship of the plurality of unit cells: winding a positive electrode sheet coated with slurry, a separator, and a negative electrode sheet coated with slurry around a hollow cylindrical winding shaft to form the core of the innermost unit cell and fitting the core with a shell and top and bottom cover plates so as to form the innermost unit cell, or producing the core of the innermost solid unit cell and fitting the core with a shell and top and bottom cover plates so as to form the innermost solid unit cell; winding another positive electrode sheet coated with slurry, another separator, and another negative electrode sheet coated with slurry around the shell to form the core of another unit cell and fitting the core of the another unit cell with another shell and top and bottom cover plates so as to form the another unit cell that is nested outside the innermost unit cell; repeating the above procedure until the core of the outermost unit cell is formed and fitting the core of the outermost unit cell with a shell and top and bottom cover plates so as to form the outermost unit cell, and thereby nesting of the plurality of unit cells is accomplished accordingly. Such a production process facilitates a continuous production and consequently an improved productivity.

Advantageously, the common side wall shared by two adjacent nested unit cells is configured as a double-wall structure including two shell walls that are connected integrally via heat dissipating fins This can further improve heat dissipation performance between two adjacent nested unit cells, in addition to an increase of mechanical strength of the assembled battery. Alternatively, heat dissipation performance between the two adjacent nested unit cells can also be improved by providing heat dissipating holes on the common side wall.

Advantageously, in the step (a), a maximum thickness of the core of each toroidal unit cell is configured to be less than or equal to 35 mm. This can limit the maximum distance from the internal electrode sheets of the cell core to the thermal conductive surface of side wall of the cell, thereby to further facilitate heat dissipation via the thermal conductive surface of side wall that forms parts of the cell shell. Here, the thickness of the toroidal cell core refers to the size of the cell core spanning between its inner side wall and outer side wall. For example, if the cell core is a hollow cylinder, its thickness corresponds to the difference between its inner and outer radiuses. However, it should be noted that the maximum thickness of the core of the unit cell is not limited to be less than 35 mm, for instance, this maximum thickness can be appropriately increased to e.g. 50 mm in an application where merely a battery with relatively low rate is desired.

Advantageously, in the step (b), a gap between two adjacent nested unit cells is configured to be not less than 5 mm. This helps to improve the heat dissipation effect of the battery pack. Here, the gap between two adjacent nested unit cells refers to the minimum distance between the outer side wall of the unit cell with smaller cross-section of the two adjacent nested unit cells and the inner side wall of the unit cell with larger cross-section of the two adjacent nested unit cells. For instance, if the inner and outer side walls are both annular, the gap is equal to the difference between the outer radius of the outer side wall of the unit cell with smaller cross-section and the inner radius of the inner side wall of the unit cell with larger cross-section. However, it should be noted that the minimum distance is not limited to 5 mm or more; instead, it may even be 0 mm in an application where merely a battery with relatively low rate is desired, that is, the outer side wall of the unit cell with smaller cross-section of the two adjacent nested unit cells and the inner side wall of the unit cell with larger cross-section of the two adjacent nested unit cells are in intimate contact, or as mentioned above, the two adjacent nested unit cells share a common side wall.

Advantageously, the step (a) further comprises providing heat dissipating fins on the inner side wall and/or outer side wall of at least one of the plurality of unit cells, so as to facilitate heat dissipation via the surface of side wall of the unit cell.

Advantageously, the toroidal unit cell is configured as a hollow cylinder. The battery pack thus obtained may have a simple structure, and may be easily manufactured and assembled. However, the invention is not limited to this. Instead, the unit cell may be of any suitable shape. For example, the unit cell may also be a hollow prism (i.e. a hollow prism with a polygonal cross-section), such as a hollow cuboid. Correspondingly, the solid unit cell may be a solid cylinder or a solid prism.

Advantageously, a center line of the through-hole of the toroidal unit cell is coincident with a geometric center line of the unit cell, wherein the through-hole may be a circular hole, a polygonal hole, or a hole of any other suitable shape. For instance, when the toroidal unit cell is a hollow cylinder, its through-hole may be a circular hole coaxial with the center axis of the cylinder. This configuration can generally reduce the maximum distance from the internal electrode sheets to the adjacent thermal conductive surface of side wall of the unit cell to a greater extent, so as to obtain a better heat dissipation via the thermal conductive surface of side wall of the unit cell; this may also facilitate assembly of the shell and core, and may help the cell core to abut against the shell tightly with more uniform stress distribution when the core expands after absorbing electrolyte, so as to reduce the torsional force applied to the shell and protect the cell better.

Advantageously, the unit cell is lithium-ion cell. However, the invention is not limited to this, and other types of unit cells, such as nickel hydride cell, nickel-cadmium cell, etc., may also be employed.

Another aspect of the invention relates to an assembled battery produced by the above methods, which is characterized in including a plurality of unit cells that are electrically connected with one another in parallel or in series and are arranged in a nested manner such that one unit cell is disposed within another unit cell.

BRIEF DESCRIPTION OF THE DRAWINGS

Other features and advantages of the invention will be apparent from the following detailed description of the preferred embodiments shown as non-restrictive examples in the drawings, wherein:

FIG. 3b shows a sectional view, taken along the line X-X, of the assembled battery in FIG. 3a;

The drawings are only for illustrative purpose and do not necessarily show the actual sizes. In order to make the drawings clearer or make some parts noticeable, it is possible to magnify some parts relative to other parts; furthermore, corresponding parts in respective embodiments and drawings are indicated by identical reference signs.

DETAILED DESCRIPTION OF THE INVENTION

A plurality of embodiments of the invention will be described below in conjunction with the drawings. According to the method for producing an assembled battery of the invention, a plurality of unit cells are firstly produced and arranged in a nested manner such that one unit cell is disposed within another unit cell, and then the plurality of unit cells are electrically connected with one another in parallel or in series.

Figure 1:
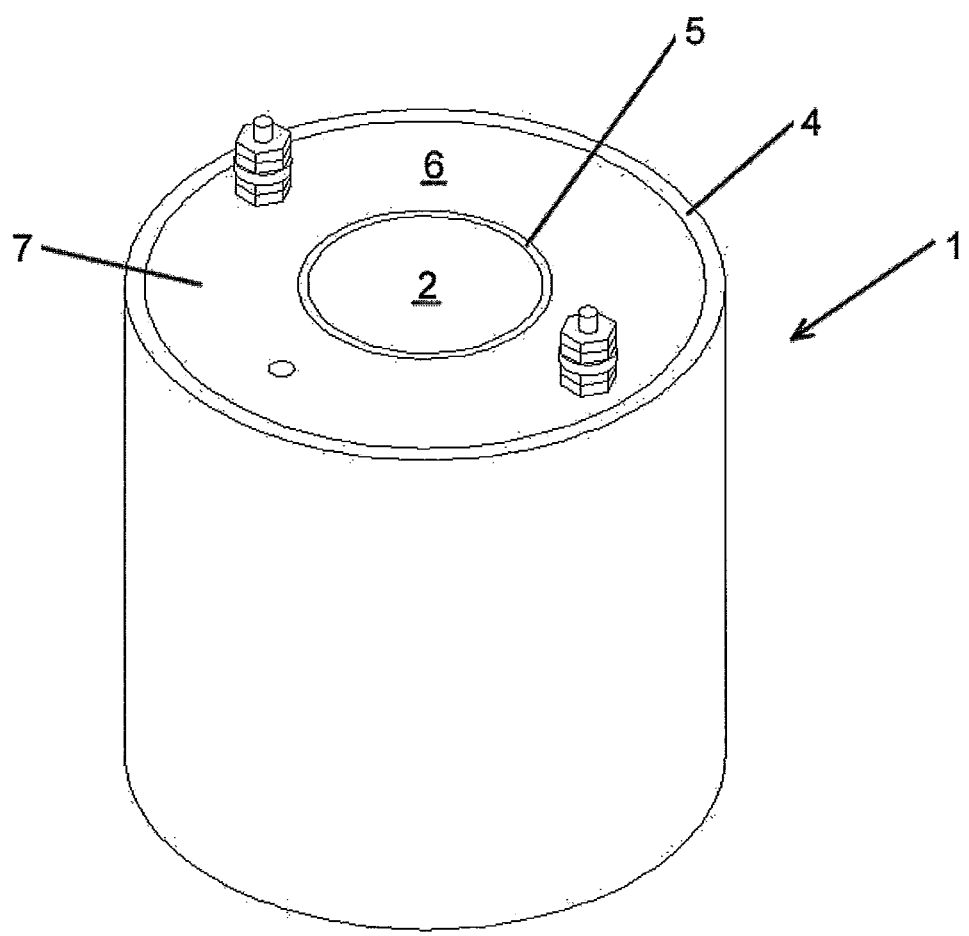
FIG. 1 shows a schematic perspective view of an exemplary toroidal unit cell in the assembled battery produced by the method according to the invention.

According to one embodiment, firstly, a plurality of toroidal unit cells 1 each having a through-hole 2, such as that as shown in FIG. 1, are produced, wherein each toroidal unit cell 1 has an inner side wall 5 defining the through-hole 2, an outer side wall 4 defining an outer circumference of the toroidal unit cell 1, and a core 6 between the inner side wall 5 and outer side wall 4. In FIG. 1, the core 6 is enclosed at the top and bottom by a top cover plate 7 and a bottom cover plate that is not shown, respectively.

Figure 2A:
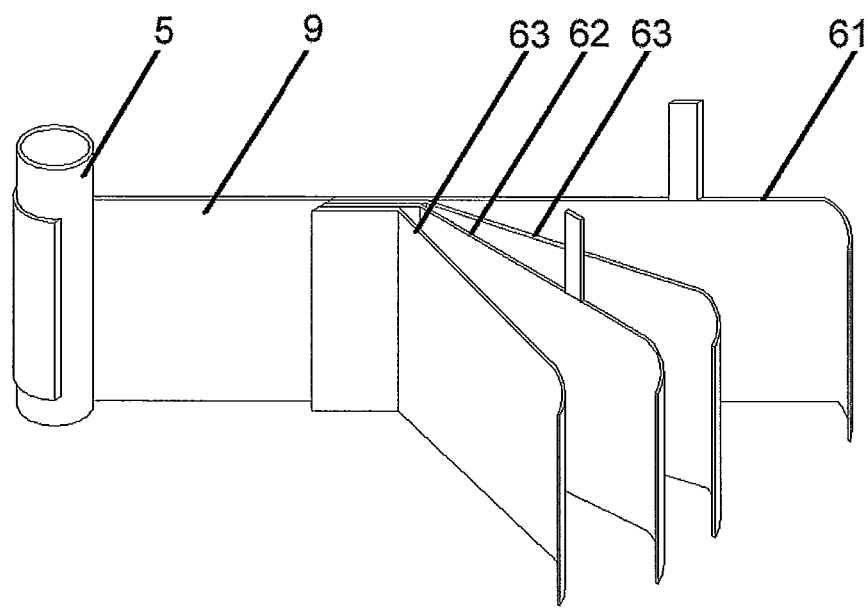
FIG. 2a shows a schematic view of the winding process of the core of the toroidal unit cell shown in FIG. 1.
Figure 2B:
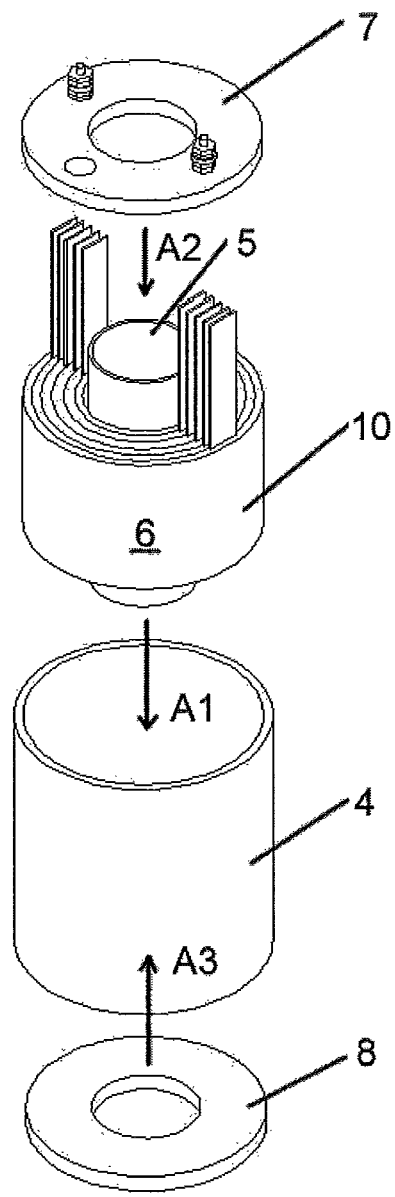
FIG. 2b shows an exploded view of manufacture and assembly of the toroidal unit cell shown in FIG. 1.

Advantageously, each toroidal unit cell 1 can be produced according to the following procedures as shown in FIGS. 2a and 2b. Firstly, a tubular, hollow cylindrical winding shaft 5 (e.g. which has an outer diameter of 62 mm, an inner diameter of 60 mm, a height of 180 mm; and is made of metal, in particular of aluminum), a positive electrode sheet 61 (e.g. with a width of 166 mm, and a length of 16.3 m) having a positive electrode tab and coated with positive electrode slurry, a negative electrode sheet 62 (e.g. with a width of 166 mm, and a length of 15.7 m) having a negative electrode tab and coated with negative electrode slurry, and a separator 63 (e.g. with a width of 170 mm) are provided, wherein the positive electrode sheet, the positive electrode slurry, the negative electrode sheet, the negative electrode slurry, and the separator are made of well-known materials in the art. For example, the positive electrode sheet is made of an aluminum foil, the positive electrode slurry is made from lithium manganate, the negative electrode sheet is made of copper foil, the negative electrode slurry is made from natural graphite, and the separator is made of polypropylene (PP) film The cell produced in this manner is lithium-ion cell, which is also taken as an example of the unit cell for illustrative description hereinbelow. Then, as shown in FIG. 2a, the separator 63, the negative electrode sheet 62 and another separator 63 are disposed successively at the same side of the positive electrode sheet 61, and are wound around the hollow cylindrical winding shaft 5 on a winding machine, so as to obtain a cell core 6 with the hollow cylindrical winding shaft 5 attached thereto as shown in FIG. 2b.

According to this embodiment, the hollow cylindrical winding shaft 5 is made of aluminum In this instance, as is well known by a person skilled in the art, only the positive electrode sheet can contact with the winding shaft 5 directly. Here, an inner-end current collector portion 9 that is not coated with positive electrode slurry may be reserved at the innermost end of the positive electrode sheet 61, and the winding process begins from the inner-end current collector portion 9. That is, the inner-end current collector portion 9 is made to contact closely with and wound around the surface of the hollow cylindrical winding shaft 5, wherein the reserved length (e.g. 200 mm in this embodiment) allows the inner-end current collector portion 9 to be wound around the surface of the winding shaft 5 by at least one turn. When the inner-end current collector portion 9 is wound, at least a part of the inner-end current collector portion 9 may be welded to the surface of the winding shaft 5 via, for example, ultrasonic welding. The above measures may enhance heat transfer between the battery core 6 and the winding shaft 5. After completion of winding of the inner-end current collector portion 9, the rest part of the positive electrode sheet 61, the negative electrode sheet 62 and the separator 63 are wound around the surface of the winding shaft 5, so as to form the cell core 6.

After completion of the winding process, the hollow cylindrical winding shaft 5 will not be removed from the cell core 6, and thus the winding shaft 5 forms the inner side wall of the toroidal unit cell 1. Then, as shown by the arrow A1 in FIG. 2b, the cell core 6 with the winding shaft 5 attached thereto is fitted into a cell shell 4 which is also made of aluminum, and the shell 4 forms the outer side wall of the toroidal unit cell 1. As is known by a person skilled in the art, also merely the positive electrode sheet can contact directly with the aluminum-made shell 4, thus it is only the positive electrode sheet that can be present at the outermost side around the winding shaft 5. Here, according to a preferable configuration, as shown in FIG. 2b, an outer-end current collector portion 10 that is not coated with slurry may be reserved at the outermost end, which is finally wound around the winding shaft 5, of the positive electrode sheet 61, with a reserved length in this embodiment of e.g. 400 mm. The outer-end current collector portion 10 contacts with the shell 4 directly, which may improve heat transfer between the cell core 6 and the shell 4. It should be noted that, merely the negative electrode sheet can contact with the winding shaft and the shell directly if the winding shaft 5 and the shell 4 are both made of stainless steel. In this case, it is possible to reserve an inner-end current collector portion and an outer-end current collector portion not coated with slurry respectively at the two ends of the negative electrode sheet in a similar way to the above, so as to facilitate heat dissipation from the cell core to the outside via its inner side and outer side.

After placing the core 6 with the inner side wall 5 attached thereto within the shell 4, as shown by the arrows A2 and A3 in FIG. 2b, the top cover plate 7, the bottom cover plate 8 and the inner side wall 5, the outer side wall 4 of the toroidal unit cell 1 are assembled together to enclose the cell core 6, so as to obtain a sealed cell shell. Here, preferably, the top and bottom cover plates and the inner and outer side walls are welded together to facilitate sealing, securing and heat transfer therebetween. Up to this time, the overall structure of the toroidal unit cell 1 as shown in FIG. 1 has been finished.

In the above embodiment, the core of the toroidal unit cell is formed by a single positive electrode sheet, a single negative electrode sheet and a single separator via the winding process. However, the invention is not limited to this, and the core of the toroidal unit cell may also be formed by a plurality of positive electrode sheets, a plurality of negative electrode sheets and separators via a laminating process. In this instance, the plurality of positive electrode sheets, the plurality of negative electrode sheets and separators are wound around the hollow cylindrical winding shaft by merely one turn after laminating; alternatively, the core of the toroidal unit cell may be formed by connecting a plurality of electrical cores with low capacity in parallel. That is, according to the method of the invention, the core of the unit cell may be formed by a variety of methods in prior art, thereby exhibiting great adaptability and wide applicability.

During the above manufacture process of the toroidal unit cell, the hollow cylindrical winding shaft 5 is a hollow cylinder; correspondingly, as shown in FIG. 1, the through-hole 2 is a circular hole and the toroidal unit cell 1 is configured as a hollow cylinder; in addition, the center line of the through-hole 2 is coincident with the geometric center line of the toroidal unit cell 1. However, the invention is not limited to this; the hollow cylindrical winding shaft may have a cross-section of any suitable shape (e.g. rectangular), and the through-hole 2 as well as the toroidal unit cell 1 may be configured to have a corresponding suitable shape; it is also possible for the center line of the through-hole 2 to be configured as not coincident with the geometric center line of the toroidal unit cell 1.

Similarly, a number of toroidal unit cells with different through-hole and cross-section dimensions are produced according to the above manufacture process, and these toroidal unit cells are arranged in a nested manner such that one unit cell is disposed within the through-hole of another unit cell. Finally, these toroidal unit cells are electrically connected with one another in parallel or in series.

Figure 3A:
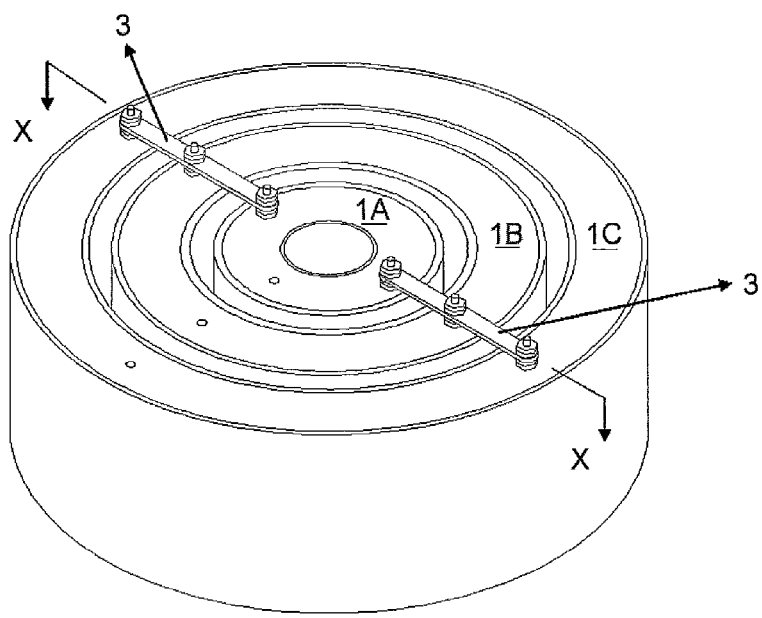
FIG. 3a shows a schematic perspective view of an assembled power battery of a first configuration produced by the method according to the invention.
Figure 3B:
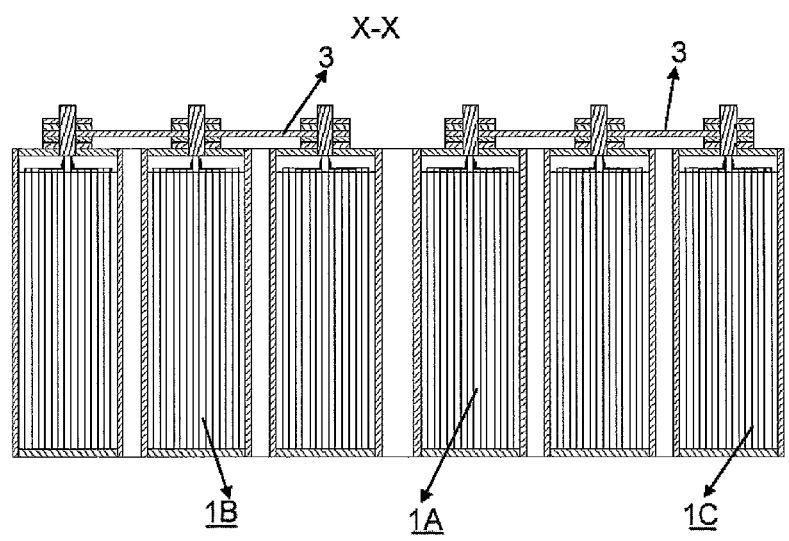

For instance, three toroidal unit cells 1A, 1B, 1C with successively increasing through-hole and cross-section dimensions may be produced, and these unit cells may be arranged in a nested manner and electrically connected in parallel, so as to obtain an assembled battery or battery pack shown in FIGS. 3a and 3b.

FIG. 3a schematically shows a lithium-ion assembled power battery of a first configuration produced by the method according to the invention. FIG. 3b shows a sectional view, taken along line X-X, of the assembled battery in FIG. 3a. As shown in FIGS. 3a and 3b, the assembled battery includes three hollow cylindrical toroidal unit cells that are connected in parallel via terminal post conductive connecting pieces 3. These three unit cells are nested within one another in the following order (from inner side to outer side): a toroidal lithium-ion power unit cell 1A with a capacity of 100 Ah, an outer diameter of 125 mm, an inner diameter of 60 mm, and a height of 180 mm; a toroidal lithium-ion power unit cell 1B with a capacity of 200 Ah, an outer diameter of 215 mm, an inner diameter of 150 mm, and a height of 180 mm; and a toroidal lithium-ion power unit cell 1C with a capacity of 300 Ah, an outer diameter of 305 mm, an inner diameter of 240 mm, and a height of 180 mm. Thus, the assembled battery has a total capacity of 600 Ah. The maximum thickness of the core for each of the three toroidal lithium-ion power unit cells 1A, 1B and 1C is 32.5 mm, and the gap between them (i.e., the smallest distance between the opposed inner and outer side walls of two adjacent unit cells) is 12.5 mm In this way, the heat dissipating effect of the assembled battery can be further improved by controlling the maximum thickness of each toroidal unit cell and/or the gap between two adjacent toroidal unit cells. However, a person skilled in the art should understand that the above settings are only illustrative, and the assembled battery may be designed according to its application and practical requirements. The assembled battery of this configuration has an energy density of 168.95 Wh/L, and the assembled battery is applicable to, for example, situations where the charge/discharge rate is not greater than 15 C.

Figure 14:
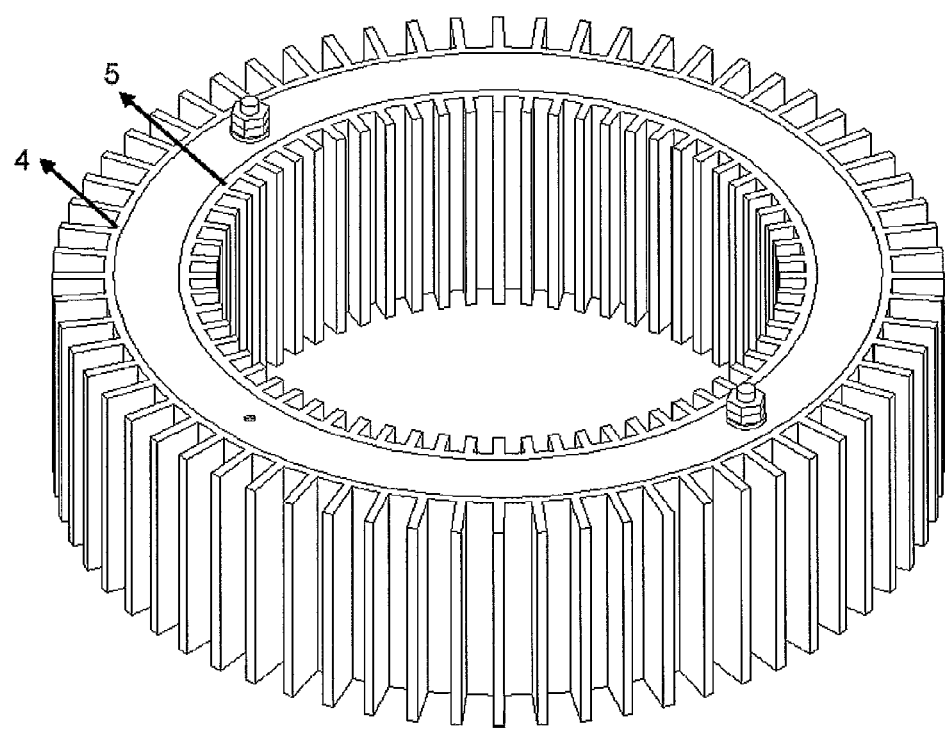
FIG. 14 shows a schematic perspective view of the toroidal cell of a comparative configuration.

For comparison, FIG. 14 schematically shows a lithium-ion battery of a comparative configuration designed by the inventor of the invention. The lithium-ion battery of the comparative configuration is a 600 Ah toroidal power unit cell with a through-hole. This toroidal power unit cell is a hollow cylinder, has an outer diameter of 590 mm, an inner diameter (i.e., the diameter of the through-hole) of 525 mm, and a height of 180 mm. The distance between the outer side wall 4 and the inner side wall 5 defining the through-hole of the battery, i.e., the thickness of the battery core is 32.5 mm, and heat dissipating fins are provided both on the outer side wall 4 and the inner side wall 5. The battery according to the comparative configuration has a maximum diameter (including the heat dissipating fins) of 615 mm, and an energy density of 41.54 Wh/L.

It can be seen that, as compared with the lithium-ion toroidal unit cell of the comparative configuration, the above assembled battery of the first configuration produced by the method according to the invention, when having an identical capacity, has a smaller overall contour size, while has an energy density 4.07 times as large as that of the battery of the comparative configuration; furthermore, the heat dissipating performance of the assembled battery as a whole can still be ensured since each unit cell of the assembled battery can perform heat dissipation effectively via the side walls thereof.

According to the above assembled battery of the first configuration, both the inner and outer side walls of each toroidal unit cell have a smooth surface. However, in order to improve heat dissipation performance of side walls, it is also possible to provide heat dissipating fins on the inner side wall and/or outer side wall of at least one of the unit cells, in a similar way to that of the toroidal unit cell of the comparative configuration, when producing respective unit cells of the assembled battery by the method according to the invention. FIGS. 4-7 show different configurations of assembled batteries of this type.

Figure 4:
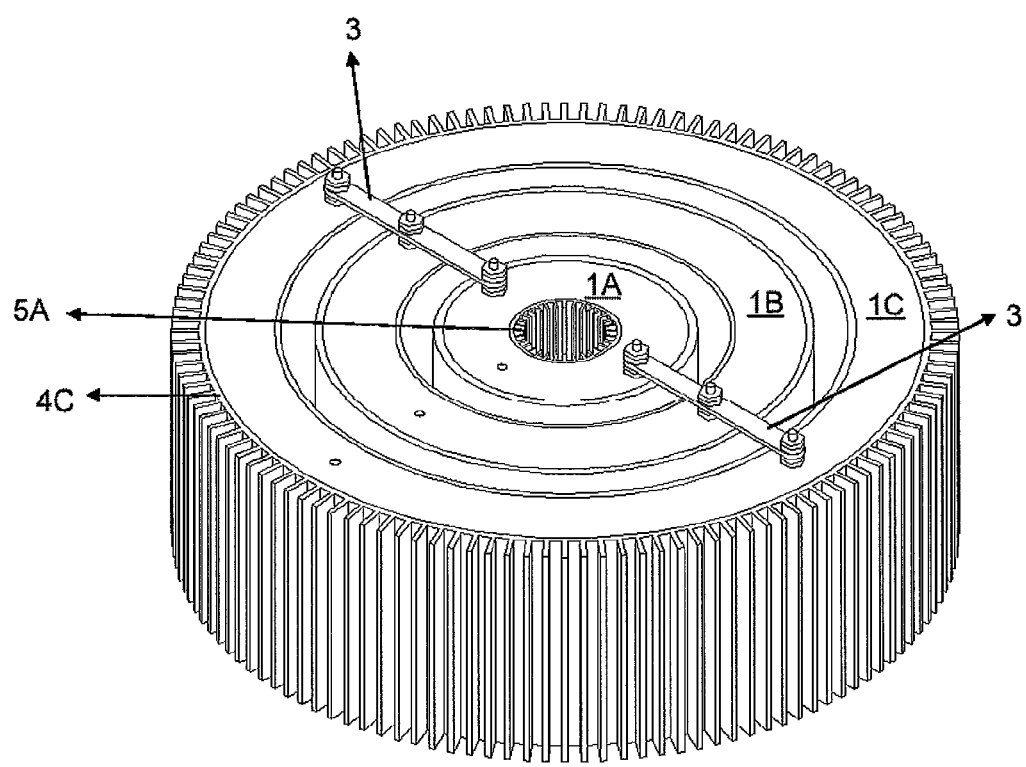
FIG. 4 shows a schematic perspective view of an assembled power battery of a second configuration produced by the method according to the invention.

FIG. 4 schematically shows a lithium-ion assembled power battery of a second configuration produced by the method according to the invention. The structure of this assembled battery is substantially the same as that of the first configuration shown in FIG. 3, and the difference lies in that: heat dissipating fins are provided on the surface of the inner side wall 5A of the toroidal lithium-ion power unit cell 1A and on the surface of the outer side wall 4C of the toroidal lithium-ion power unit cell 1C. The assembled battery of this configuration has a maximum diameter (including the heat dissipating fins) of 330 mm, and an energy density of 144.25 Wh/L when taking account of the heat dissipating fins, which is 3.47 times as large as that of the battery of the comparative configuration. With strengthening ventilation, the assembled battery of this configuration is applicable to, for example, situations where charge/discharge rate is not greater than 20 C.

Figure 5:
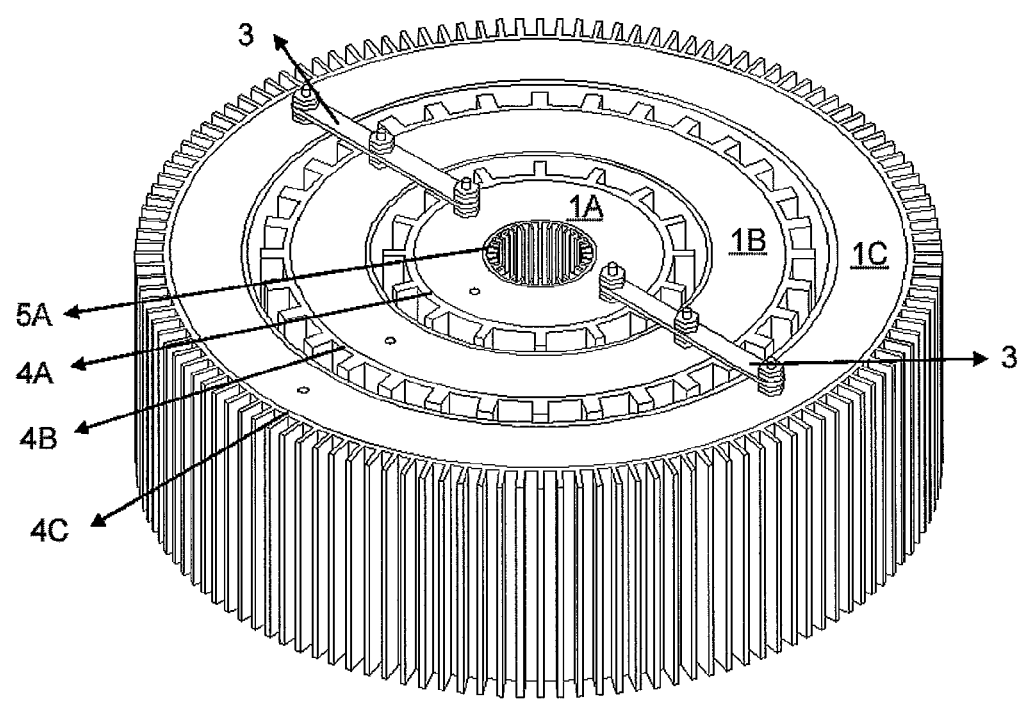
FIG. 5 shows a schematic perspective view of an assembled power battery of a third configuration produced by the method according to the invention.

FIG. 5 schematically shows a lithium-ion assembled power battery of a third configuration produced by the method according to the invention. The structure of this assembled battery is also substantially the same as that of the first configuration shown in FIG. 3, and the difference lies in that: heat dissipating fins are provided on the surfaces of the outer side wall 4A and the inner side wall 5A of the toroidal lithium-ion power unit cell 1A, on the surface of the outer side wall 4B of the toroidal lithium-ion power unit cell 1B, and on the surface of the outer side wall 4C of the toroidal lithium-ion power unit cell 1C. The assembled battery of this configuration has an energy density of 144.25 Wh/L when taking account of the heat dissipating fins, which is 3.47 times as large as that of the battery of the comparative configuration. With strengthening ventilation, the assembled battery of this configuration is applicable to, for example, situations where charge/discharge rate is not greater than 30C.

Figure 6:
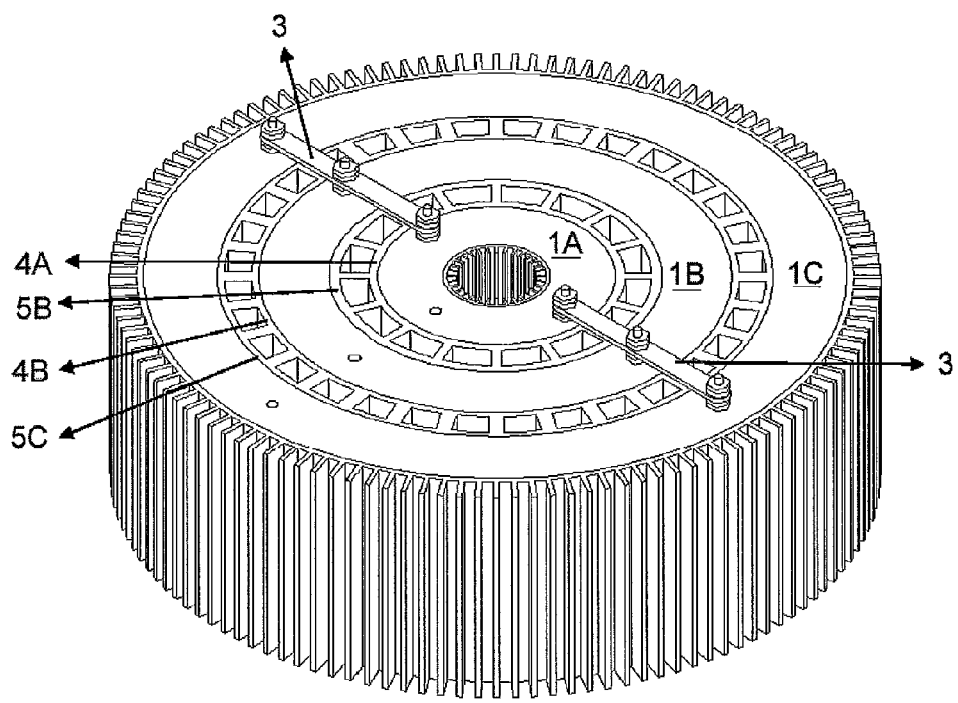
FIG. 6 shows a schematic perspective view of an assembled power battery of a fourth configuration produced by the method according to the invention.

FIG. 6 schematically shows a lithium-ion assembled power battery of a fourth configuration produced by the method according to the invention. The structure of this assembled battery is substantially the same as that of the third configuration shown in FIG. 5, and the difference lies in that: the outer side wall 4A of the toroidal lithium-ion power unit cell 1A and the inner side wall 5B of the toroidal lithium-ion power unit cell 1B are fixedly connected integrally via heat dissipating fins; the outer side wall 4B of the toroidal lithium-ion power unit cell 1B and the inner side wall 5C of the toroidal lithium-ion power unit cell 1C are fixedly connected integrally via heat dissipating fins. The assembled battery of this configuration has an energy density of 144.25 Wh/L when taking account of the heat dissipating fins, which is 3.47 times as large as that of the battery of the comparative configuration. With strengthening ventilation, the assembled battery of this configuration is applicable to, for example, situations where charge/discharge rate is not greater than 30 C.

Figure 7:
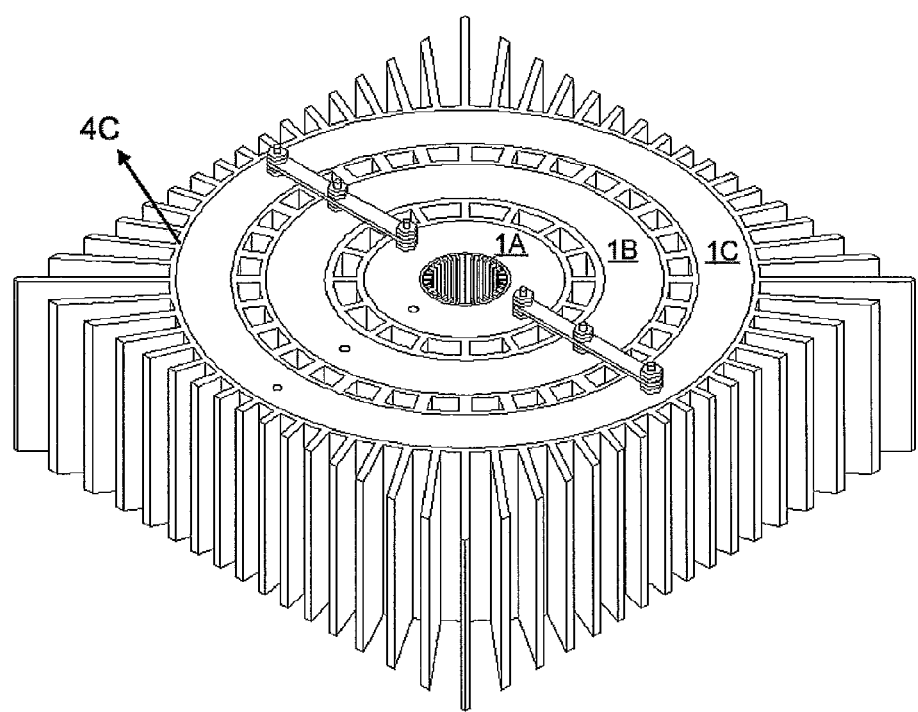
FIG. 7 shows a schematic perspective view of an assembled power battery of a fifth configuration produced by the method according to the invention.

FIG. 7 schematically shows a lithium-ion assembled power battery of a fifth configuration produced by the method according to the invention. The structure of this assembled battery is substantially the same as that of the fourth configuration shown in FIG. 6, and the difference lies in that: the overall outer contour formed by all the heat dissipating fins on the outer side wall 4C of the toroidal lithium-ion power unit cell 1C is configured as a square shape. This facilitates the arrangement of a plurality of assembled batteries, and thus it is possible to make full use of the spaces among the assembled batteries for disposing heat dissipating fins to enhance heat dissipation. Obviously, the overall outer contour of heat dissipating fins may also be configured to take any other suitable shapes according to specific spatial arrangement requirements, such as triangle, trapezoid, or even irregular geometric shapes. The assembled battery of this configuration, taking account of the exterior heat dissipating fins, has a size of 320 mm×320 mm and an energy density of 120.4 Wh/L. With strengthening ventilation, the assembled battery of this configuration is applicable to, for example, situations where charge/discharge rate is not greater than 30 C.

According another embodiment of the manufacture method of the invention, different from the above embodiments, the toroidal unit cell that is nested in the innermost among the plurality of toroidal unit cells is replaced by a solid unit cell. That is, a solid unit cell, and one or more toroidal unit cells each having a through-hole, are firstly produced and arranged in a nested manner such that one unit cell is disposed within the through-hole of another unit cell; afterwards, these unit cells are electrically connected with one another in parallel or in series. The structure and the manufacture process of the toroidal unit cell are the same as those described in the above embodiments, and the solid unit cell comprises a core and an outer side wall defining an outer circumference of the solid unit cell as well.

Figure 8:
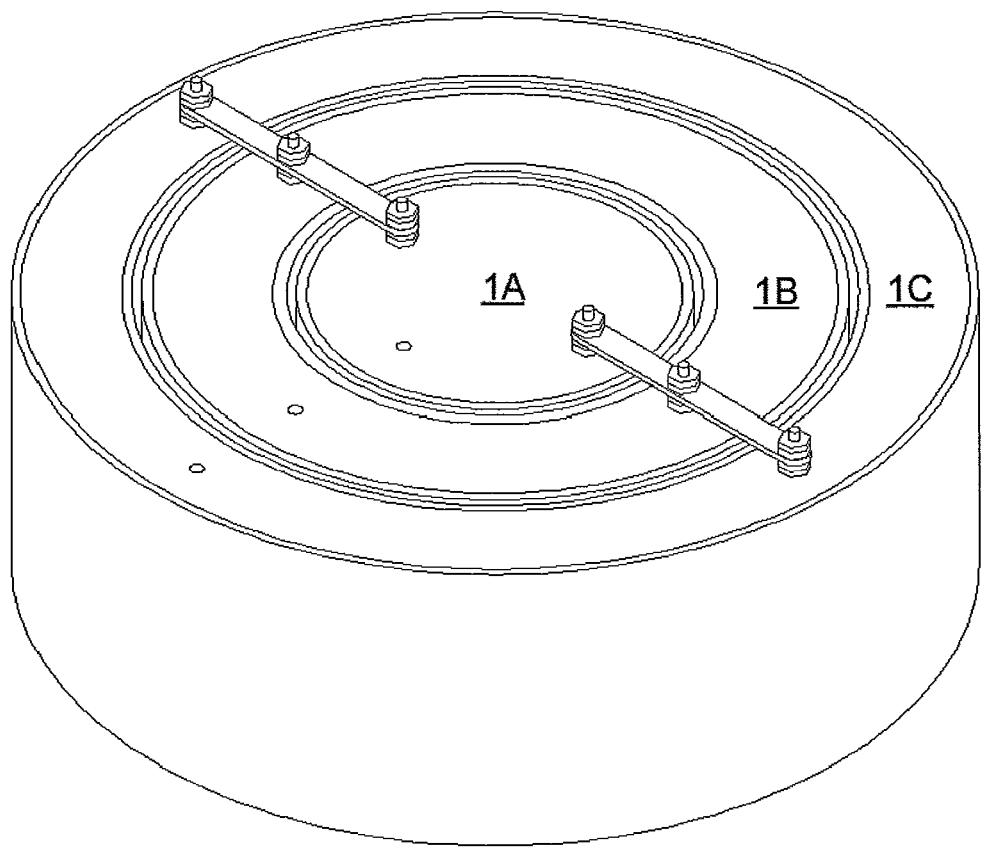
FIG. 8 shows a schematic perspective view of an assembled power battery of a sixth configuration produced by the method according to the invention.
Figure 9:
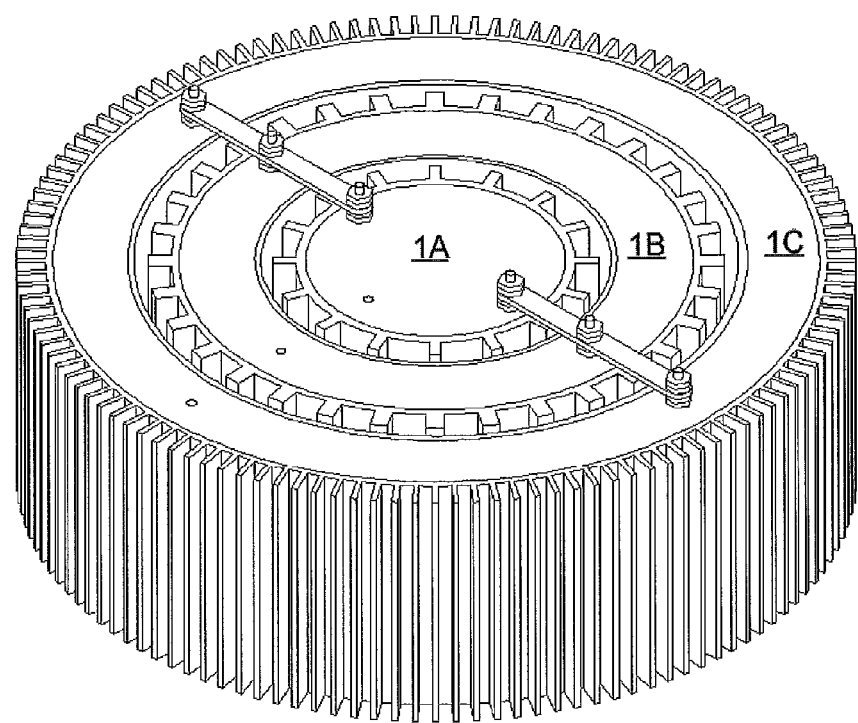
FIG. 9 shows a schematic perspective view of an assembled power battery of a seventh configuration produced by the method according to the invention.
Figure 10:
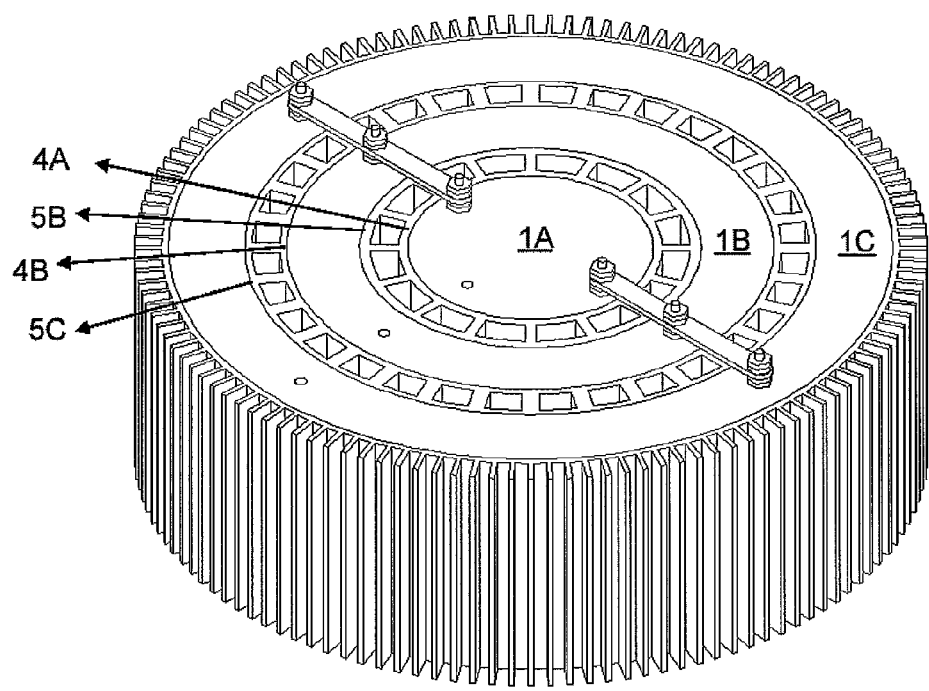
FIG. 10 shows a schematic perspective view of an assembled power battery of an eighth configuration produced by the method according to the invention.

When producing the solid unit cell, firstly a solid core thereof is manufactured by a winding process or a laminating process; afterwards, the solid core is placed into a shell that forms the outer side wall of the solid unit cell; finally, a top cover plate, a bottom cover plate and the outer side wall of the solid unit cell are assembled together to enclose the core of the solid unit cell. The shape of the solid unit cell may be configured to match with the shape of the through-hole of the toroidal unit cell that is nested outside the solid unit cell, e.g. may be configured as a solid cylinder or a solid prism, etc. In addition, in order to improve heat dissipation, it is also possible to provide heat dissipating fins on the outer side wall of the solid unit cell. FIGS. 8-10 show different configurations of the assembled battery produced by the method of this embodiment according to the invention.

FIG. 8 schematically shows a lithium-ion assembled power battery of a sixth configuration produced by the method according to the invention. The assembled battery of this configuration also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 102 mm, an outer diameter of 172 mm, a capacity of 200 Ah, and a maximum heat conductive distance of 17.5 mm; and a toroidal unit cell 1C with an inner diameter of 174 mm, an outer diameter of 240 mm, a capacity of 300 Ah, and a maximum heat conductive distance of 16.5 mm. The total capacity of this assembled battery is 600 Ah as well, and no heat dissipating fins are provided on the outer and inner side walls of the three unit cells, while the gap between the respective unit cells is relatively small, only 2 mm. The assembled battery has an energy density of 272.8 Wh/L, and may be applicable to, for example, situations where maximum discharge rate is not greater than 2 C.

FIG. 9 schematically shows a lithium-ion assembled power battery of a seventh configuration produced by the method according to the invention. The assembled battery of this configuration also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 110 mm, an outer diameter of 180 mm, a capacity of 200 Ah, and a maximum heat conductive distance of 17.5 mm; and a toroidal unit cell 1C with an inner diameter of 190 mm, an outer diameter of 255 mm, a capacity of 300 Ah, and a maximum heat conductive distance of 16.25 mm As shown in FIG. 9, except that the innermost unit cell 1A is a solid unit cell, this assembled battery is similar to that of the third configuration both in structure and in arrangement of heat dissipating fins. The assembled battery, taking account of the exterior heat dissipating fins, has a maximum diameter of 265 mm and an energy density of 223.7 Wh/L, and may be applicable to, for example, situations where maximum discharge rate is not greater than 4 C.

FIG. 10 schematically shows a lithium-ion assembled power battery of an eighth configuration produced by the method according to the invention. The structure of this assembled battery is substantially the same as that of the seventh configuration shown in FIG. 9, and the difference lies in that: the outer side wall 4A of the solid lithium-ion power unit cell 1A and the inner side wall 5B of the toroidal lithium-ion power unit cell 1B are fixedly connected integrally by heat dissipating fins; the outer side wall 4B of the toroidal lithium-ion power unit cell 1B and the inner side wall 5C of the toroidal lithium-ion power unit cell 1C are fixedly connected integrally by heat dissipating fins. This assembled battery, taking account of the exterior heat dissipating fins, has a maximum diameter of 265 mm and an energy density of 223.7 Wh/L, and may be applicable to, for example, situations where maximum discharge rate is not greater than 4 C.

Figure 11:
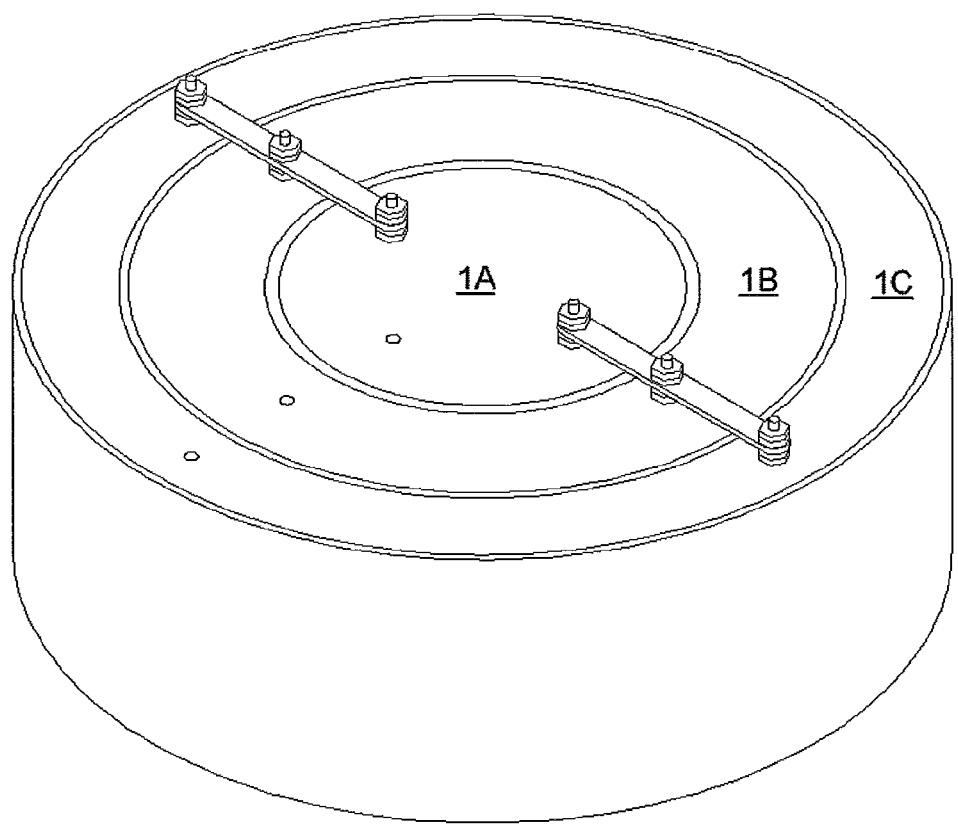
FIG. 11 shows a schematic perspective view of an assembled power battery of a ninth configuration produced by the method according to the invention.

In particular, FIG. 11 schematically shows a lithium-ion assembled power battery of a ninth configuration produced by the method according to the invention. The assembled battery of this configuration also includes three unit cells that are nested within one another in the following order (from inner side to outer side): a solid unit cell 1A with a diameter of 100 mm, a height of 180 mm, a capacity of 100 Ah, and a maximum heat conductive distance of 25 mm; a toroidal unit cell 1B with an inner diameter of 100 mm, an outer diameter of 170 mm, a capacity of 200 Ah, and a maximum heat conductive distance of 17.5 mm; and a toroidal unit cell 1C with an inner diameter of 170 mm, an outer diameter of 236 mm, a capacity of 300 Ah, and a maximum heat conductive distance of 16.5 mm. As shown in FIG. 11, the outer side wall of the solid unit cell 1A coincides with the inner side wall of the toroidal unit cell 1B, so that these two unit cells share a common side wall; the outer side wall of the toroidal unit cell 1B coincides with the inner side wall of the toroidal unit cell 1C, so that these two unit cells share a common side wall as well; no heat dissipating fins are provided on the outer side wall of the toroidal unit cell 1C. This assembled battery has an energy density of 282.1 Wh/L, and may be applicable to, for example, situations where maximum discharge rate is not greater than 1C. A person skilled in the art may appreciate that, when manufacturing the assembled battery of this special configuration, the solid unit cell 1A nested in the innermost may be replaced by a toroidal unit cell having corresponding dimensions. Moreover, it is possible to provide heat dissipating fins on the side walls of the outermost and/or innermost toroidal unit cell.

Figure 12:
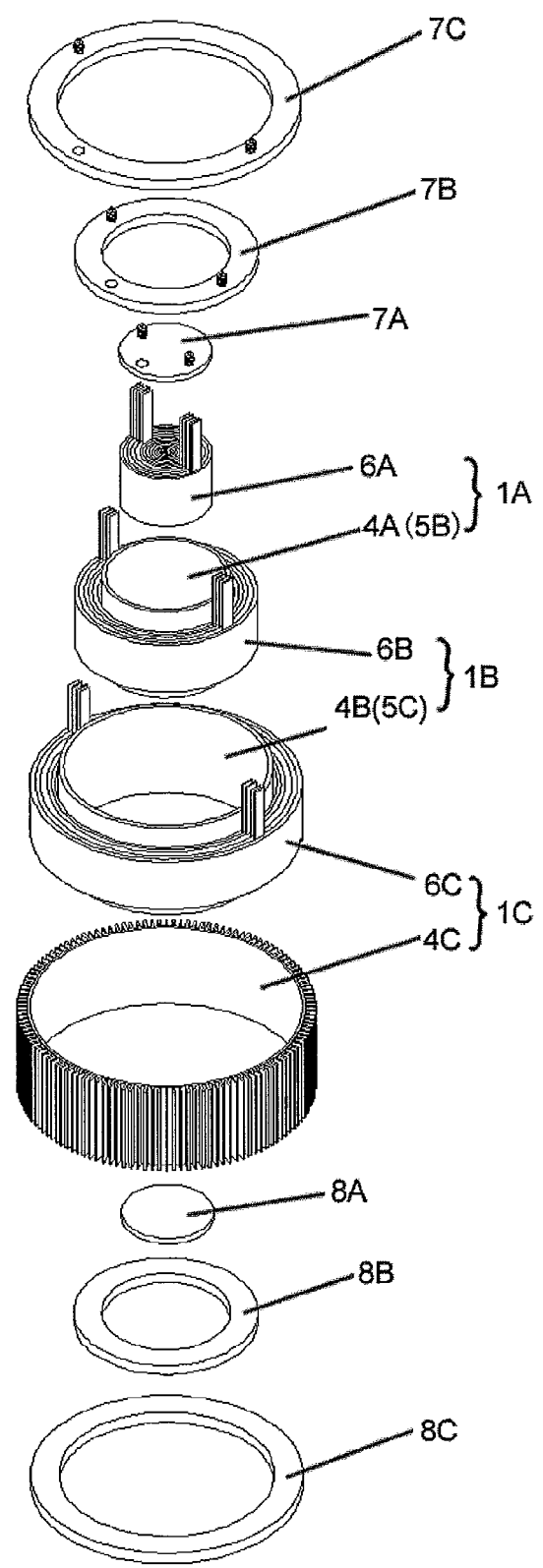
FIG. 12 shows an exploded view of manufacture and assembly of the assembled battery shown in FIG. 11.

As to this special configuration of the assembled battery, the manufacture process of each unit cell per se is generally the same as the above described process, whereas manufacture of the unit cells can be performed together with nesting of the unit cells. FIG. 12 shows an exploded view of manufacture and assembly of an assembled battery of this special configuration. The assembled battery also includes three unit cells 1A, 1B, 1C that are nested within one another from inner side to outer side, wherein the innermost unit cell 1A is a solid unit cell. During manufacture of the solid unit cell 1A, its solid core 6A is produced at first, but the solid core is not placed into the shell 4A and fitted with top and bottom cover plates. Similarly, during manufacture of the toroidal unit cell 1B or 1C, a positive electrode sheet, a negative electrode sheet and a separator are wound around hollow cylindrical winding shaft 5B or 5C to form the core 6B or 6C with the inner side wall, but the core is not placed into the corresponding shell 4B or 4C and fitted with top and bottom cover plates. A person skilled in the art could understand that, if the solid unit cell 1A nested in the innermost is replaced by a toroidal unit cell, it can be produced in the same way as the toroidal unit cell 1B or 1C. It should also be noted that there is no limitation to the manufacture order of the above unit cells; instead, these unit cells may be produced in any order. Afterwards, the solid core 6A, the core 6B with the inner side wall 5B and the core 6C with the inner side wall 5C are placed in any order but in a nested manner into the shell 4C of the toroidal 1 nit cell 1C, and are respectively fitted with top and bottom cover plates 7A-7C and 8A-8C of the respective unit cells in any order, so as to obtain the assembled battery as shown in FIG. 11 (except that additional heat dissipating fins are provided on the shell 4C). In other words, during the manufacture process of this assembled battery, when the inner unit cell of two adjacent nested unit cells is produced, the inner side wall of the outer unit cell of the two adjacent nested unit cells serves as the outer side wall/shell of the inner unit cell, and simultaneously with this process, nesting of the two adjacent nested unit cells is accomplished with these two adjacent unit cells sharing a common side wall.

According to a variation of the above described manufacture method, manufacture of the unit cells is also carried out together with nesting of the unit cells; however, the plurality of unit cells are produced and nested successively from inside to outside according to positional relationship of the plurality of nested unit cells. Still taking the assembled battery shown in FIG. 12 as an example, firstly, the innermost unit cell core 6A is manufactured and fitted with a shell 4A as well as top and bottom cover plates 7A and 8A, so as to form the innermost solid unit cell 1A (or alternatively, the innermost unit cell core is formed by winding a positive electrode sheet coated with slurry, a separator, and a negative electrode sheet coated with slurry around a hollow cylindrical winding shaft, and fitted with a shell and top and bottom cover plates, so as to form the innermost toroidal unit cell); afterwards, another unit cell core 6B is formed by winding a positive electrode sheet coated with slurry, a separator, a negative electrode sheet coated with slurry around the shell 4A, and fitted with another shell 4B and top and bottom cover plates 7B, 8B so as to form another unit cell 1B that is nested outside the innermost unit cell 1A; the above procedure is repeated until the outermost unit cell core 6C is produced and fitted with a shell 4C and top and bottom cover plates 7C, 8C so as to form the outermost unit cell 1C. Simultaneously with this procedure, nesting of the plurality of unit cells is also accomplished. In the above process, a continuous production as well as an increase in productivity is achieved by using the shell of the former produced unit cell as the winding shaft to produce the core of the next unit cell. It should also be noted that, fitting of top and bottom cover plates for all unit cells can also be carried out together after the cores of all unit cells have been produced and fitted with respective shells.

Figure 13:
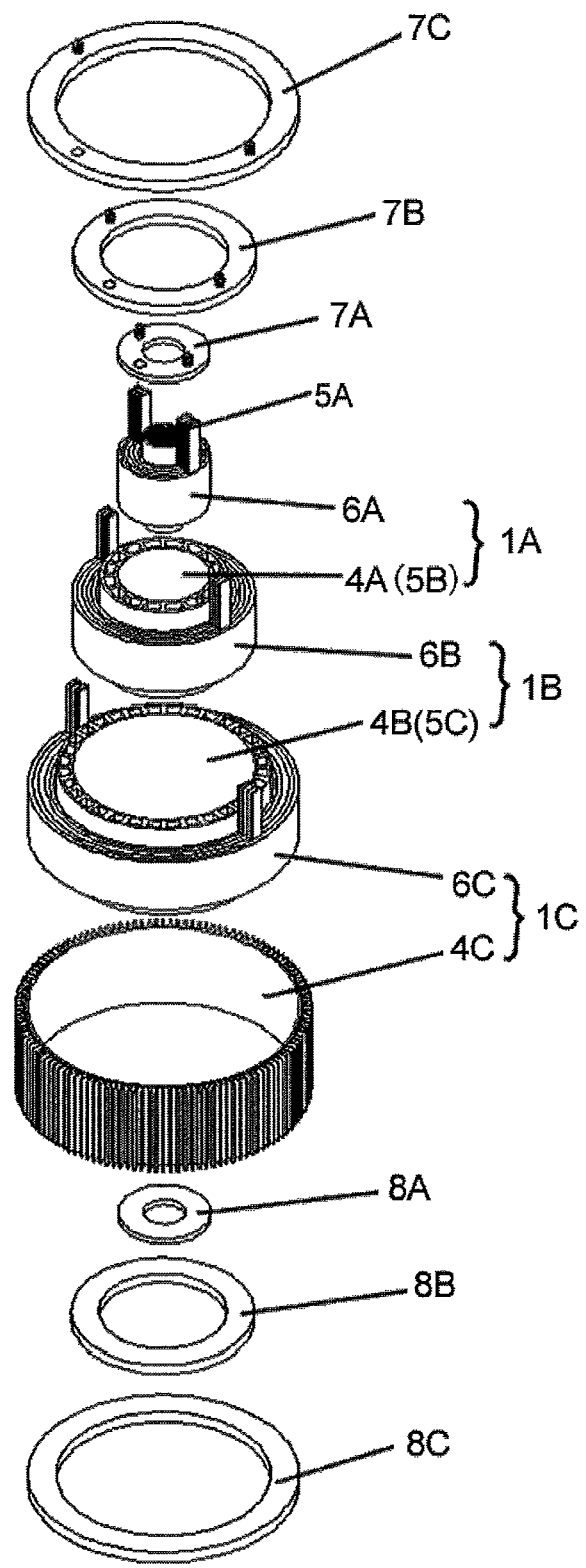
FIG. 13 shows an exploded view of manufacture and assembly of the assembled battery shown in FIG. 6.

According to the above manufacture method for the assembled battery of said special configuration and the variation thereof, if the common side wall shared by two adjacent nested unit cells is configured as a double-wall structure including two shell walls that are connected integrally via heat dissipating fins, heat dissipation among respective unit cells can be further improved while the advantage of manufacture simplification may be maintained FIG. 13, similar to FIG. 12, shows such a manufacture and assembly process. The difference between FIG. 13 and FIG. 12 merely lies in that the common side wall shared by two adjacent nested unit cells is replaced by a double-wall structure, and the innermost nested solid cell 1A is replaced by a toroidal cell 1A. The assembled battery of the fourth configuration shown in FIG. 6 can be produced quickly according to the manufacture and assembly process shown in FIG. 13.

When producing the assembled battery of the first to the third, the sixth and seventh configuration as described above, the three unit cells in the assembled battery are nested and assembled together detachably. Thereby a very flexible structure may be provided, in which the number of the nested unit cells in the assembled battery may be increased or decreased as required, so as to provide assembled batteries with different capacities. For example, an assembled battery with a capacity of 400 Ah can be obtained by only connecting the unit cells 1A and 1C via terminal post conductive connecting pieces 3. In addition, besides electrical connection via terminal post conductive connecting pieces 3, the three unit cells can also be mechanically connected additionally by means of any other suitable means known in the prior art to enhance mechanical stability of the assembled battery. For example, a casing may be further disposed outside the assembled battery for accommodating this assembled battery to facilitate transportation and installation of the whole assembled battery.

During production of the assembled battery of the fourth, fifth, eighth and ninth configuration as described above, two adjacent nested unit cells share a single-wall or double-wall side wall, which not only simplifies the manufacture process, but also enhances the mechanical strength of the assembled battery, thus making the structure of the whole assembled battery more stable. In particular, for the double-wall structure formed by fixedly connecting the inner side wall and outer side wall of two adjacent nested unit cells integrally via heat dissipating fins, heat transfer between the two adjacent unit cells may be further improved. In addition, in the instance where two adjacent unit cells share a single-wall side wall, heat dissipation between the unit cells may be improved by providing heat dissipating holes on this single-wall side wall.

As compared with the toroidal unit cell of the comparative configuration, the energy density of the assembled battery of the above various configurations produced by the method according to the invention is greatly increased. Moreover, since heat dissipation performance of the whole assembled battery depends upon heat dissipation performance of the individual unit cells in the assembled battery, heat dissipation performance of the assembled battery may be ensured by appropriately setting maximum thickness of the unit cells and/or gaps between respective unit cells, and/or by providing heat dissipating fins.

Although the invention has been described in detail with reference to the specific embodiments hereinabove, a person skilled in the art should understand that, the invention is not limited thereto, and various modifications, substitutions and variations easily conceivable by a person skilled in the art according to teaching of the disclosure of the invention fall within the scope of protection of the invention. For example, according to the method of the invention, a plurality of toroidal unit cells may be configured to have different heights, different maximum thicknesses, different shapes and so on. In addition, the maximum thickness of a toroidal unit cell as well as the gap between adjacent unit cells can be appropriately set as desired to obtain a suitable balance between energy density and heat dissipation performance. The number of the nested unit cells in the assembled battery is also not limited to three as described in the above embodiments, and it may be two, four or more as required; the capacity of various unit cells in the assembled battery is not limited to the specific values in the above embodiments, and unit cells with various capacities may be used as required. The discharge rate applicable for the assembled battery of the above different configurations produced by the method according to the invention is also not limited to the specific values in the above embodiments, and the assembled battery can be applied to various situations where different discharge rates are required according to practical requirement. In the above embodiments, the unit cells in the assembled battery are electrically connected with one another in parallel to increase the capacity of the assembled battery; however, it is also possible to electrically connect respective unit cells in series to increase the voltage of the assembled battery. In addition, when producing the assembled battery by the method of the invention, the arrangement of heat dissipating fins is not limited to those in the above embodiments; instead, heat dissipating fins may be disposed on the entire or part of the surface of any selected inner side wall and/or outer side wall of one or more unit cells as desired according to practical requirement and specific application. The scope of protection of the invention is indicated specifically by the appended claims.

The invention claimed is:

1. A method for producing an assembled battery, comprising the following steps:
(a) producing a plurality of toroidal unit cells each having a through-hole and each toroidal unit cell comprising an inner side wall defining the through-hole, an outer side wall defining an outer circumference of the toroidal unit cell, and a core between the inner side wall and the outer side wall by:
(a1) winding a positive electrode sheet coated with slurry, a separator, and a negative electrode sheet coated with slurry around a hollow cylindrical winding shaft to form the core of the toroidal unit cell, and forming the inner side wall of the toroidal unit cell by the hollow cylindrical winding shaft;
(a2) placing the core with the inner side wall attached thereto into a shell, and forming the outer side wall of the toroidal unit cell by the shell; and
(a3) assembling a top cover plate, a bottom cover plate, the inner side wall, and the outer side wall of the toroidal unit cell together in such a way as to enclose the core of the toroidal unit cell;
(b) arranging the plurality of toroidal unit cells in a nested manner such that one toroidal unit cell is disposed within the through-hole of another toroidal unit cell: and
(c) electrically connecting the plurality of toroidal unit cells with one another in parallel or in series,
wherein the inner side wall of an outer unit cell of two adjacent nested unit cells serves as the outer side wall of an inner unit cell of the two adjacent nested unit cells, so that the two adjacent nested unit cells share a common side wall and the common side wall shared by the two adjacent nested unit cells is configured as a double-wall structure including two shell walls that are connected integrally via heat dissipating fins.

2. The method according to claim 1, wherein an inner-end current collector portion that is not coated with slurry is reserved at the innermost end of the positive electrode sheet or the negative electrode sheet which is to contact directly with a surface of the hollow cylindrical winding shaft, and at least a part of the inner-end current collector portion is welded to the surface of the hollow cylindrical winding shaft.

3. The method according to claim 2, wherein the reserved inner-end current collector portion is wound around the surface of the hollow cylindrical winding shaft by more than one turn.

4. The method according to claim 2, wherein an outer-end current collector portion that is not coated with slurry is reserved at the outermost end of the positive electrode sheet or the negative electrode sheet which is to be wound at the outermost side around the hollow cylindrical winding shaft, and the outer-end current collector portion contacts directly with the shell.

5. The method according to claim 1, wherein in the step (a), a maximum thickness of the core of each toroidal unit cell is configured to be less than or equal to 35 mm.

6. The method according to claim 1, wherein in the step (b), a gap between two adjacent unit cells is configured to be greater than or equal to 5 mm.

7. The method according to claim 1, wherein the step (a) further includes providing heat dissipating fins on the inner side wall and/or outer side wall of at least one of the plurality of unit cells.

8. The method according to claim 1, wherein the toroidal unit cell is configured as a hollow cylinder or a hollow prism, and a center line of the through-hole of the toroidal unit cell is coincident with a geometric center line of the toroidal unit cell.

9. The method according to claim 1, wherein the unit cell is lithium-ion cell.

10. A method for producing an assembled battery, comprising the following steps:
(a) producing a plurality of toroidal unit cells each having a through-hole, each toroidal unit cell comprising an inner side wall defining the through-hole, an outer side wall defining an outer circumference of the toroidal unit cell, and a core between the inner side wall and the outer side wall;
(b) arranging the plurality of toroidal unit cells in a nested manner such that one toroidal unit cell is disposed within the through-hole of another toroidal unit cell; and
(c) electrically connecting the plurality of unit cells with one another in parallel or in series,
wherein step (a) and step (b) are carried out together: winding a positive electrode sheet coated with slurry, a separator, and a negative electrode sheet coated with slurry around a hollow cylindrical winding shaft, so as to form the innermost unit cell core; winding another positive electrode sheet coated with slurry, another separator, and another negative electrode sheet coated with slurry around another hollow cylindrical winding shaft which foams a shell of the innermost unit cell core, so as to form another unit cell core that is to be nested outside the innermost unit cell core; repeating the above procedure until the outermost unit cell core is formed; assembling all the unit cell cores with respective hollow cylindrical winding shafts, and a shell of the outermost unit cell core together in a nested manner, and fitting the unit cell cores with respective top and bottom cover plates; and wherein the shells are configured as a double-wall structure including two shell walls, and the two shell walls are connected integrally via heat dissipating fins.

11. The method according to claim 10, wherein in step (a), a maximum thickness of the core of each toroidal unit cell, is configured to be less than or equal to 35 mm.

12. The method according to claim 10, wherein in step (b), a gap between two adjacent unit cells, is configured to be greater than or equal to 5 mm.

13. The method according to claim 10, wherein step (a) further includes providing heat dissipating fins on the inner side wall and/or outer side wall of at least one of the plurality of unit cells.

14. The method according to claim 10, wherein the toroidal unit cell is configured as a hollow cylinder or a hollow prism, and a center line of the through-hole of the toroidal unit cell is coincident with a geometric center line of the toroidal unit cell.

15. The method according to claim 10, wherein the unit cell is a lithium-ion cell.

16. A method for producing an assembled battery, comprising the following steps:
(a) producing a plurality of toroidal unit cells each having a through-hole, each toroidal unit cell comprising an inner side wall defining the through-hole, an outer side wall defining an outer circumference of the toroidal unit cell, and a core between the inner side wall and the outer side wall;
(b) arranging the plurality of toroidal unit cells in a nested manner such that one toroidal unit cell is disposed within the through-hole of another toroidal unit cell; and
(c) electrically connecting the plurality of unit cells with one another in parallel or in series,
wherein step (a) and step (b) are carried out together, and the plurality of unit cells are produced and nested successively from inside to outside according to positional relationship of the plurality of nested unit cells: winding a positive electrode sheet coated with slurry, a separator, and a negative electrode sheet coated with slurry around a hollow cylindrical winding shaft to form the core of the innermost unit cell and fitting the core with a shell and top and bottom cover plates so as to form the innermost unit cell; winding another positive electrode sheet coated with slurry, another separator, and another negative electrode sheet coated with slurry around the shell to form the core of another unit cell and fitting the core of the another unit cell with another shell and top and bottom cover plates so as to form the another unit cell that is nested outside the innermost unit cell; repeating the above procedure until the core of the outermost unit cell is formed and fitting the core of the outermost unit cell with a shell and top and bottom cover plates so as to form the outermost unit cell, and thereby nesting of the plurality of unit cells is accomplished accordingly and, wherein the shells are configured as a double-wall structure including two shell walls, and the two shell walls are connected integrally via heat dissipating fins 17. The method according to claim 16, wherein in step (a), a maximum thickness of the core of each toroidal unit cell, is configured to be less than or equal to 35 mm.

18. The method according to claim 16, wherein in step (b), a gap between two adjacent unit cells, is configured to be greater than or equal to 5 mm.

19. The method according to claim 16, wherein step (a) further includes providing heat dissipating fins on the inner side wall and/or outer side wall of at least one of the plurality of unit cells.

20. The method according to claim 16, wherein the toroidal unit cell is configured as a hollow cylinder or a hollow prism, and a center line of the through-hole of the toroidal unit cell is coincident with a geometric center line of the toroidal unit cell.

21. The method according to claim 16, wherein the unit cell is a lithium-ion cell.

* * * * *

UNITED STATES PATENT AND TRADEMARK OFFICE
CERTIFICATE OF CORRECTION

PATENT NO.        : 8,546,011 B2
APPLICATION NO.   : 13/057653
DATED             : October 1, 2013
INVENTOR(S)       : Xinping Qiu et al.

Page 1 of 1

It is certified that error appears in the above-identified patent and that said Letters Patent is hereby corrected as shown below:

In the Claims:

Column 15, Line 65, Claim 1, delete "cell:" and insert -- cell; --

Column 16, Line 65, Claim 1, delete "foams" and insert -- forms --

Signed and Sealed this
Eighteenth Day of February, 2014

Michelle K. Lee
*Deputy Director of the United States Patent and Trademark Office*